United States Patent
Aoki

[19]

[11] Patent Number: 6,069,325
[45] Date of Patent: May 30, 2000

[54] SEAT WEIGHT MEASURING APPARATUS

[75] Inventor: Hiroshi Aoki, Shiga, Japan

[73] Assignee: Takata Corporation, Tokyo, Japan

[21] Appl. No.: 09/288,631

[22] Filed: Apr. 9, 1999

[30] Foreign Application Priority Data

Apr. 16, 1998 [JP] Japan .................................. 10-121627

[51] Int. Cl.[7] .......................... G01G 19/08; G01G 23/02; G01G 21/08; B60K 28/00; B60R 21/32
[52] U.S. Cl. .......................... 177/136; 177/144; 177/154; 177/188; 177/170; 177/256; 280/735; 180/273
[58] Field of Search .................................. 177/136, 144, 177/154, 155, 156, 157, 158, 170, 171, 256, 257, 258, 259, 187, 188; 280/735; 180/273

[56] References Cited

U.S. PATENT DOCUMENTS

| | | | |
|---|---|---|---|
| 3,354,710 | 11/1967 | Johnson ................................... | 177/154 |
| 3,997,014 | 12/1976 | Soderholm et al. ..................... | 177/155 |
| 4,359,099 | 11/1982 | Henslin ................................... | 177/256 |
| 4,396,079 | 8/1983 | Brendel ................................... | 177/154 |
| 4,726,435 | 2/1988 | Kitagawa et al. ....................... | 177/187 |
| 4,799,562 | 1/1989 | Burrows et al. ........................ | 177/144 |
| 5,319,161 | 6/1994 | Miller et al. ............................ | 177/154 |
| 5,410,109 | 4/1995 | Tarter et al. ............................. | 177/136 |
| 5,864,295 | 1/1999 | Jarocha ............................... | 177/210 R |
| 5,971,432 | 10/1999 | Gagnon et al. ......................... | 280/735 |
| 6,000,717 | 12/1999 | Rayford et al. ......................... | 280/735 |

*Primary Examiner*—Randy W. Gibson
*Attorney, Agent, or Firm*—Kanesaka & Takeuchi

[57] ABSTRACT

A seat weight measuring apparatus measures a seat weight including a weight of a passenger sitting on an automotive seat. The seat weight measuring apparatus is formed of seat connecting mechanisms with arms for connecting the seat to seat fixing portions located on a car body, load sensor mechanisms for receiving and detecting the seat weight applied between the car body and the seat, and displacement restriction mechanisms for restricting displacement of the seat relative to the seat fixing portions within a predetermined range. Each arm of the seat connecting mechanisms has a seat side end and a car body side end, and one or both ends is pivotally supported on pivots. The characteristic of the weight applied to the load sensor is simplified to easily and accurately measure the weight of the passenger on the seat.

10 Claims, 9 Drawing Sheets

SEAT WEIGHT MEASURING APPARATUS

BACKGROUND OF THE INVENTION

1. Field of the Invention

The present invention relates to an apparatus for measuring a seat weight including a weight of a passenger sitting on an automotive seat and more specifically to a seat weight measuring apparatus capable of simplifying characteristics of load acting on load sensors as much as possible and measuring the seat weight with high precision. The invention also relates to a seat weight measuring apparatus with advantages capable of improving safety when abnormal forces act on the seat or to alleviate strength requirements for the load sensors. The invention further relates to a seat weight measuring apparatus capable of reducing its overall thickness, thereby being constructed in a small size.

2. Description of a Related Art

Automobiles are equipped with seat belts and airbags to secure safety for passengers. In recent years, there is a trend for controlling the operation of such safety devices according to the weight of a passenger for improved performance of seat belts and airbags. For example, the amount of gas introduced into the airbag or an airbag inflating speed and a pre-tension of the seat belt are adjusted according to the weight of a passenger. For that purpose, some means are needed for measuring the weight of a passenger sitting on the seat. An example of such means includes a proposal (Japanese Patent Application No. 9-156666 filed by the applicant of this invention) which involves arranging load sensors (load cells) at four corners under seat rails and summing vertical loads acting on the load cells to determine the seat weight including the weight of a passenger.

The load sensors of the seat weight measuring apparatus described above are preferably of a small type with a measuring capacity of up to some 50 kg. Such load sensors may include: sensors having a strain gauge attached (or formed) on a sensor plate that deflects when it is subjected to a load; piezoelectric sensors; and electrostatic sensors that detect displacements of an elastic member that deflects upon receiving a load.

Meanwhile, Japanese Patent Publication No. JP-A-10-297334 discloses a passenger weight detection apparatus that calculates a gravity center of a loaded seat based on seat weights detected from loads acting on front and rear parts of the seat and which corrects the seat weight according to the calculated gravity center and then, based on the corrected seat weight, estimates the weight of a passenger.

This official gazette, however, was published on Nov. 10, 1998 and was not publicly known at a time when the application (Japanese Patent Application No. 10-121627) that forms a basis for claiming the priority of the present invention was filed on Apr. 16, 1998. Further, the gazette does not disclose a displacement restriction mechanism for the passenger weight detection apparatus that restricts a seat displacement relative to a seat fixing portion within a specified range.

It is an object of the present invention to provide a seat weight measuring apparatus having the following characteristics.

(1) Simplify characteristics of loads acting on the sensors as practically as possible to easily measure the weight of a passenger on the seat.

(2) Improve safety when abnormal force acts on the seat.

(3) Reduce its overall size as well as the machining and assembly costs.

To achieve these objectives, a seat weight measuring apparatus for measuring a seat weight including the weight of a passenger sitting on an automotive seat comprises: seat connecting mechanisms including arms for connecting the seat to seat fixing portions, the arms having a seat side end thereof and a car body side end thereof, one end or both ends pivotally supported on pivots; load sensor mechanisms for receiving and detecting the seat weight applied between the car and the seat; and displacement restriction mechanisms for restricting displacement of the seat relative to the seat fixing portions within a predetermined range the displacement mainly caused by a pivotal motion of the arms.

Because the seat is connected to the car body by the seat connecting mechanisms, which include pivotally supported arms, the displacement of the seat relative to the car body when the seat is loaded is regulated to some extent. Hence, the characteristic of the load acting on the load sensors is simplified, facilitating the measurement of the weight of a passenger on the seat. In this case, it is preferred that the load sensors selectively receive the vertical component of the seat weight bearing on the arms.

An object of what is referred to as the seat weight measuring apparatus in this specification is basically to measure the weight of a passenger on the seat. Therefore, an apparatus that measures only the weight of a passenger by canceling the weight of the seat itself is included in what is called the seat weight measuring apparatus in this specification.

In the present invention, the load sensors preferably receive the seat weight through the arms. In this case, the displacement of the seat can be amplified or de-amplified by the lever action of the arms as it is transmitted to the load sensors. The load range of the load sensors can be changed by a leverage of the arms, making it possible to reduce the size and weight of the load sensors as well as their cost.

Further, it is preferred in the invention that one set of the load sensors be provided on each lateral side of the seat for each of the load sensors to detect a total weight bearing on the whole left or right portion of the seat. This apparatus thus can reduce the number of sensors as well as the number and length of wiring. As an example, the apparatus may employ a construction in which the load sensors each include a sensor plate for receiving a load and a sensor body for detecting a deflection or strain of the sensor plate and in which the sensor plate connects central side ends of the arms of the front and rear seat connecting mechanisms. This construction has the advantage of assembling two sensors into a single sensor and of reducing characteristic variations due to temperature and sensitivity variations.

It is also preferred in the invention that the displacement of the shaft pins of the pivots relative to the car body or seat be restricted by the displacement restriction mechanisms. It is also preferable that the pivot connecting members such as seat brackets and seat rails be provided with means for restricting the deviations of the shaft pins, to reduce the number of constitutional components.

When anchor fixing portions for the seat belts (buckles) are connected to the seat rails or seat, the displacement restriction mechanisms may be provided only to locations near the anchor fixing portions. Alternatively, the displacement restriction mechanisms may be provided to a plurality of locations including those near the anchor fixing portions, and only the displacement restriction mechanisms near the anchor fixing portions may be made robust enough to withstand the tensile force of the seat belts of some 2500 kgf. This allows the overall weight of the seat weight measuring apparatus to be reduced.

DESCRIPTION OF THE PREFERRED EMBODIMENTS

With reference to the accompanying drawings preferred embodiments of this invention will be described.

Figure 1:
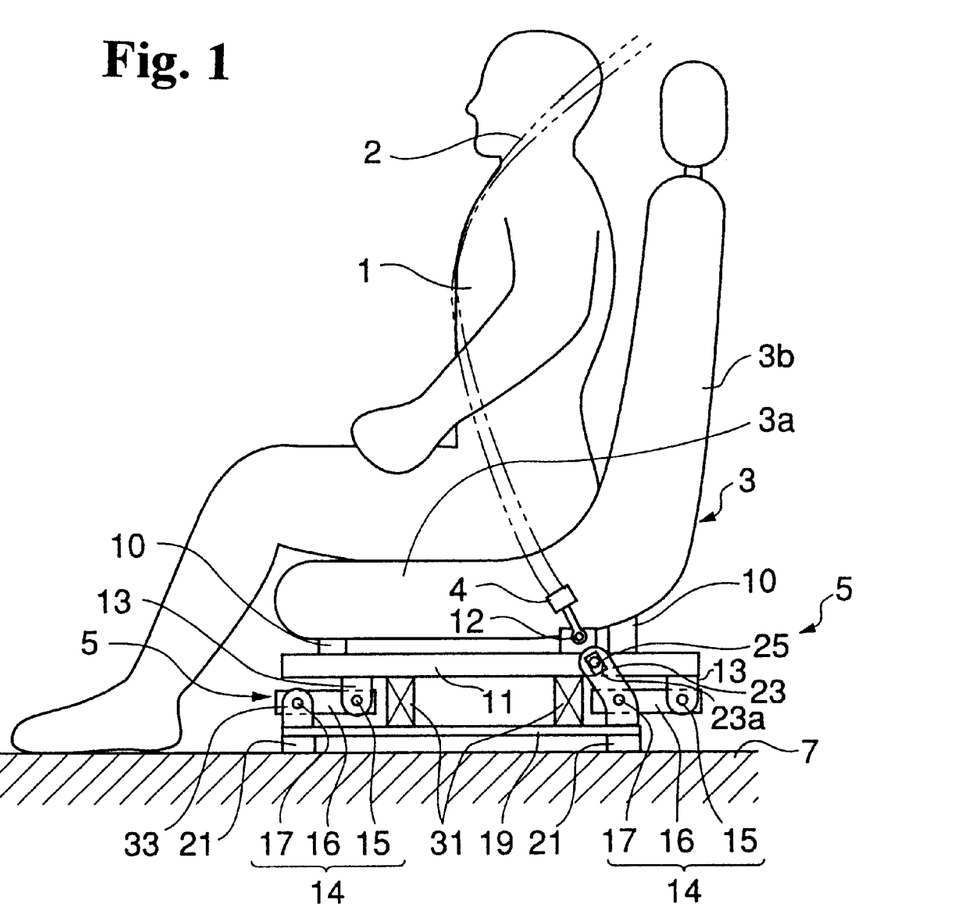
FIG. 1 is a side view showing a schematic overall construction of a seat weight measuring apparatus according to one embodiment of the present invention.

FIG. 1 is a side view schematically showing the overall construction of one embodiment of a seat weight measuring apparatus according to the invention.

Throughout this specification, words "longitudinal" and "lateral" refer to longitudinal and lateral directions as seen by a passenger 1, respectively.

Shown in the figure are a seat 3, a passenger 1 on the seat, and a seat weight measuring apparatus 5 installed below the seat. The seat 3 includes a seat cushion 3a on which the passenger 1 is seated, and a seat back 3b against which the passenger rests his or her back. Seat adjusters 10 project from the bottom of the seat cushion 3a at four locations, front and rear on both sides. While only two front and rear adjusters 10 on the left side are shown in the figure, the right side adjusters 10 are hidden on the far side. Such an illustrative relation also applies to other portions to be described below. The seat adjusters 10 are portions of the frame that project from the seat 3, capable of being slidably adjusted on seat rails 11 to the longitudinal direction of the passenger 1.

The seat rails 11 extend longitudinally of a car body and have a grooved cross section (not shown), in which the lower end portions of the seat adjusters 10 slide. There are two seat rails 11, one on each lateral side, under the seat cushion 3a. In a conventional seat with no seat weight measuring apparatus, the seat rails 11 are securely bolted to seat brackets of a chassis of a car body. At a rear part of each of the seat rail 11, an anchor fixing portion 12 for fixing a buckle 4 of a seat belt 2 is provided. The anchor fixing portion 12 is loaded with a tension of the seat belt 2. The anchor fixing portion 12 has a breaking load of 2000 kgf or higher assuming a case of a car collision.

Under the seat rail 11, two sets of front and rear seat weight measuring apparatuses 5 are provided in the front and rear portion thereof. It should be noticed that under the right side seat rail, two sets of front and rear seat weight measuring apparatuses 5 (not shown) are also installed. Conclusively, four seat weight measuring apparatuses 5 are provided at four locations, front portion and rear portion on both sides, below the seat 3.

The seat weight measuring apparatus 5 of this embodiment includes a seat connecting mechanism 14 and a load sensor 31, disposed between the seat rail 11 and the seat brackets 21. Two pairs of pin brackets 13 are projected from an underside of the seat rail 11 at front and rear portions thereof. Though not shown, at each of the front and rear portions of one seat rail 11 two pin brackets 13 are provided, one on each lateral side. The pin brackets 13 are formed with a laterally piercing pin hole, through which a shaft pin 15 is passed.

Also on the seat brackets 21 are erected front side pin brackets 33 and rear side pin brackets 23, the latter also serving as restriction brackets. Though not shown, two brackets 33 or 23 are disposed side by side at each location of the front and rear seat brackets 21. These pairs of the brackets 33, 23 are each formed with a laterally piercing hole, through which a shaft pin 17 is passed.

The front and rear shaft pins 17, 15 are also inserted into front and rear pin holes of arms 16. The arms 16 pivot about the shaft pins 17, and the front and rear arms 16 are equal in length. Hence, the seat rail 11 and the two front and rear arms 16 form parallelograms.

When a load sensor 31 is in a reference state, as described later, the front and rear shaft pins 17, 15 are almost equal in height above a chassis 7. Thus, when a load acting on the load sensor 31 changes and the sensor 31 is slightly deformed, the displacement of the seat rail 11 with respect to a sensor base 19 is primarily in the vertical direction only. Therefore, the force acting on the load sensor 31 turns out to be mainly in the vertical direction, thus reducing external disturbances that affect the measurement of the weight of a passenger. In other words, the longitudinal and lateral components of the load acting on the seat are borne mainly by the pivots of the arms.

A plate-like sensor base 19 bridges the front and rear seat brackets 21 to reinforce the seat brackets. If the seat brackets are strong enough, there is no need to reinforce them with the sensor base. Between the sensor base 19 and the seat rail 11 there are arranged two front and rear load sensors (load cells) 31, which may be chosen from a wide range of sensors with plate-, bar- and sheet-like configurations, including a type having a strain gauge attached to a strain plate, a piezoelectric type, an electrostatic capacitance type, a magnetic strain type and a pressure-sensitive resistance type.

When a passenger 1 is not seated, the front load sensor 31 is applied with a load of 0 to 5 kgf and the rear sensor with a load of 5 to 10 kilograms force (kgf). When a passenger weighing 70 kg is sitting normally (in a reference state), the front sensor receives 5–20 kgf and the rear sensor 10–30 kgf. The measuring range of the load sensor 31 generally ranges from −100 kgf (tensile) to +100 kgf and an adjustment should preferably be made so that the reading for the reference state falls in a central region of the measurement range.

Next, a displacement restriction mechanism installed between the seat rail 11 and the seat brackets 21 will be described. The rear pin bracket 23 that also functions as a restriction bracket has its upper part extending forwardly upwardly. The upper part of the bracket 23 extends to the side of the seat rail 11 and also has a slot 23a. The slot 23a, though illustrated considerably long in the figure, may in practice be a slightly loose hole. The slot 23a is shaped in an arc that has a radius equal to a center-to-center distance between the shaft pin 15 and the shaft pin 17. The slot 23a receives a restriction pin 25 that projects from the side portion of the seat rail 11. As the arm 16 pivots, the seat rail 11 linked with the arm moves vertically, causing the restriction pin 25 to slide in the slot 23a.

When the restriction pin 25 abuts against the end of the slot 23a, the seat rail 11 cannot move further. As a result, the displacement of the seat rail 11 relative to the seat bracket 21 is restricted. The displacement range is preferably within 2 mm above or below the reference state. More preferably, the displacement range is ±0.7–1.5 mm. With this size of stroke, the seat weight measuring apparatus can be assembled to the seat and the seat fixing portion without trouble with current dimensional accuracy of the seat rail and the seat bracket.

Until the displacement restriction mechanism starts to work, the load sensor 31 is subjected to a load and therefore deflects.

The longitudinal and lateral loads acting on the seat 3 under normal condition are transmitted from the seat rail 11 to the seat bracket 21 through the shaft pins 15, 17 and the arm 16. Since the displacement restriction mechanism that restricts the relative displacement between the seat and the seat fixing portion is provided when a force in excess of a specified value (e.g., a force exceeding the measurement range) acts on the load sensor, the excess load is supported not by the load sensor but by the displacement restriction mechanism (load limiting mechanism). Thus the breaking load requirement to the load sensor 31 can be designed significantly small, realizing reductions in the size and cost of the load sensor.

In the embodiment of FIG. 1, the displacement restriction mechanism (the restriction pin 25 and the restriction bracket 23) is provided at only one location, left rear portion of the seat, where the anchor fixing portion 12 for the seat belt is provided. This allows the anchor fixing portion 12 to bear a large tensile force produced by the seat belt 2 that holds the passenger 1 from moving forward at time of car collision.

Another embodiment will be described hereafter.

Figure 2A:
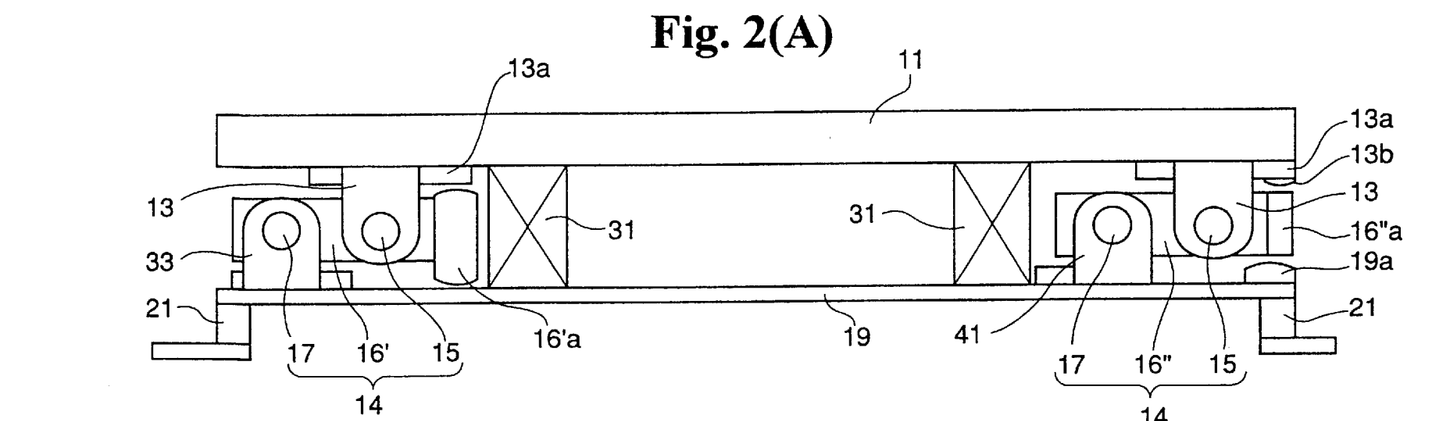
FIGS. 2(A)–2(B) are side views showing constructions of variations of the embodiment of a seat weight measuring apparatus shown in FIG. 1.
Figure 2B:
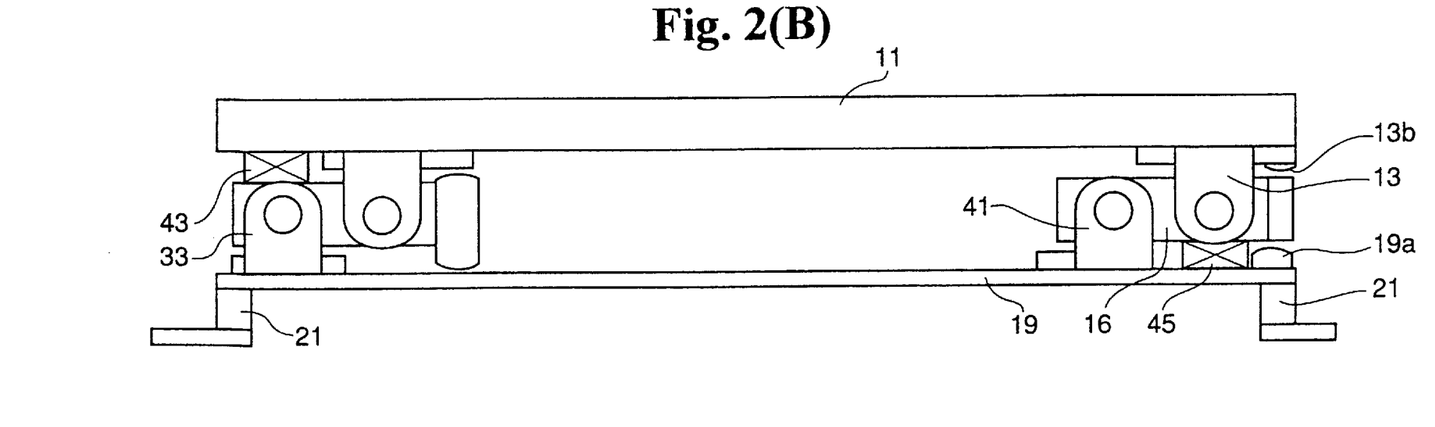

FIGS. 2A and 2B show side views describing constructions of variations of the embodiment of a seat weight measuring apparatus of FIG. 1.

In the figure, components with the same reference numerals as those in FIG. 1 represent similar components.

In the embodiment of FIGS. 2(A) & 2(B) the construction of the seat connecting mechanism 14 and the arrangement of the load sensors 31 are identical to those of the embodiment described by FIG. 1. However, a pin bracket 41 at the left rear portion has the same structure as the front pin bracket 33 and is not provided either with an extended portion extending forwardly upwardly or with a slot.

In the embodiment of FIGS. 2(A) & 2(B), a displacement restriction mechanism is formed at one end portion of arms 16', 16". At rear end portion of the front arm 16', a hammer head-shaped restriction portion 16'a is formed. The restriction portion 16'a has its upper surface opposed to the lower surface of a pedestal 13a of a pin bracket 13 with a specified clearance therebetween. The lower surface of the restriction portion 16'a is opposed to the upper surface of a sensor base 19 with a specified clearance therebetween. These clearances are 1–2 mm in the reference state described above.

In a rear displacement restriction mechanism (at the right) in FIG. 2A, a straight restriction portion 16"a having no hammer head-shaped portion is formed at the rear end portion of an arm 16". Instead, a protrusion 13b is provided on the underside of the pedestal 13a of the pin bracket 13 and a raised portion 19a is provided on the upper surface of the sensor base 19.

The point in which the embodiment of FIG. 2B differs from the embodiment of FIG. 2A is that load sensors 43, 45 are provided between the pin brackets 33, 13 and the seat rail 11 or sensor base 19. The arrangement of FIG. 2B allows the load sensors to be located near the front and rear ends of the seat rail, which offers an advantage of improved stability of the load sensors as a holding mechanism.

Figure 3A:
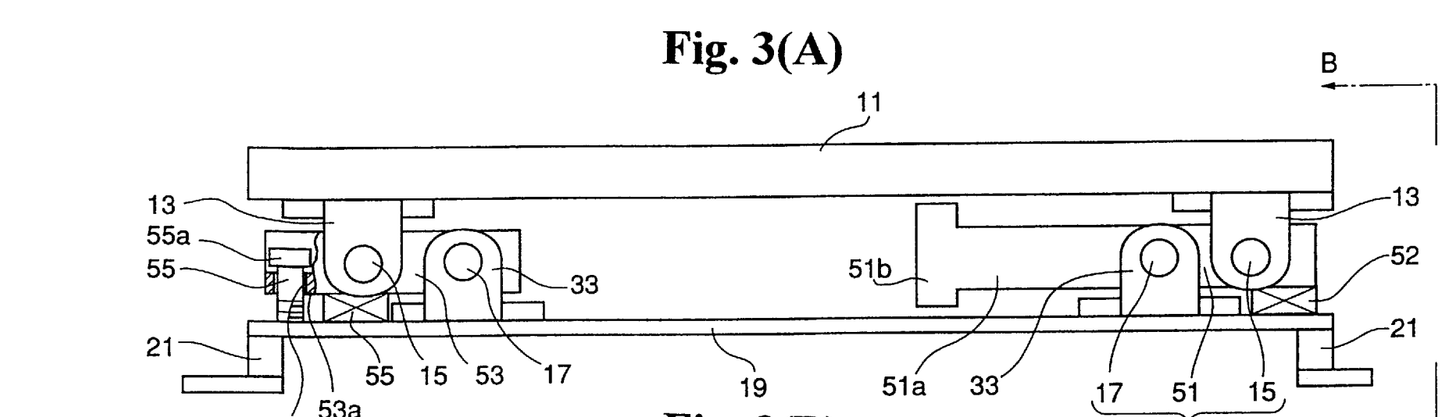
FIGS. 3(A)–3(B) are side views showing a construction of another embodiment of a seat weight measuring apparatus according to the invention.
Figure 3B:
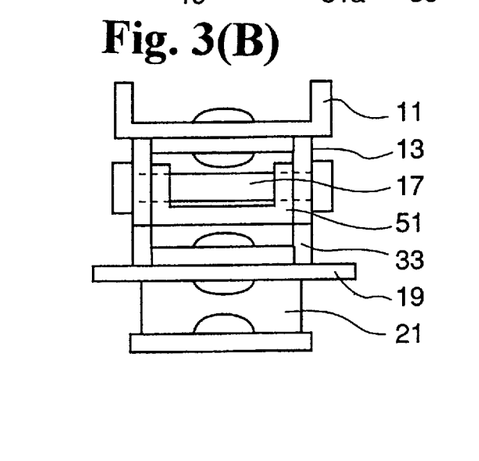

FIGS. 3(A) & 3(B) shows another embodiment of a seat weight measuring apparatus according to the invention. FIG. 3A represents an overall side view of the apparatus and FIG. 3B a side view as seen from the arrow B—B of FIG. 3A.

The main points in which the embodiment of the seat weight measuring apparatus of FIG. 3(A) differs from the embodiment of FIG. 2(A) are as follows.

(1) The front and rear shaft pins 17 on the sensor base 19 side are both located relatively to the center portion of the sensor base 19, and the front and rear shaft pins 15 on the seat rail 11 side are both located on the outer portion. That is, the seat rail 11 and the front and rear arms 53, 51 do not form a parallelogram link mechanism. However, because of elastic deformations of various members and clearances of pin portions, the arms 51, 53 slightly pivot.

(2) Load sensors 52, 55 are both interposed between the arms 51, 53 and the sensor base 19, thus receiving a load bearing on the seat rail 11 through the arms 51, 53. Therefore, the arms 51, 53 can be designed to extend toward the center portion of the seat rail 11 to increase the displacement of the front ends of the arms, which offers an advantage of alleviating dimensional accuracy requirements of the restriction mechanism.

(3) A front side arm pivoting restriction mechanism (at the left in the figure) has a restriction rod 56 with a flange-like restriction portion 55a formed at the head. The restriction rod 56 is erected on the sensor base 19 and passes through a restriction hole 53b formed in a bottom plate 53a of the arm 53. There is predetermined clearance between the outer circumferential surface of the restriction rod 55 and the restriction hole 53b.

The arm 53, as with the arm 51 shown in FIG. 3B, comprises a bottom plate and side plates altogether being U-shaped in it's cross section with an open side directed upward. The diameter of the restriction portion 55a at the head of the restriction rod 55 is larger than that of the restriction hole 53b. When an upward force acts on the seat rail 11 and the arm 53 pivots upward, the upper surface of an arm bottom plate 53a abuts against the lower surface of the restriction portion 55a of the restriction rod 55, stopping the pivoting motion of the arm 53 and therefore the displacement of the seat rail 11 with respect to the seat bracket 21 is restricted. In the reference state, there is a clearance of about 1–2 mm between the lower surface of the restriction portion 55a of the restriction rod 55 and the upper surface of the bottom plate 53a of the arm 53.

(4) The rear arm 51 (at the right in the figure) extends long toward the center (extension portion 51a). The extension portion 51a has a hammer head-shaped restriction portion 51b at the front end thereof. The top surface of the restriction portion 51b is opposed to the underside of the seat rail 11 and the underside of the restriction portion 51b is opposed to the upper surface of the sensor base 19 with specified clearances therebetween. The pivoting motion of the arm 51 is restricted by the restriction portion 51b engaging these opposing surfaces.

In this example, the distance between the shaft pin 17 on the sensor base side and the restriction portion 51b is approximately two times the distance between the shaft pin 17 and the load sensor 52. Hence, the displacement of the restriction portion 51b for a given pivoting angle of the arm 51 is magnified to two times the displacement of the load sensor 52. This allows a large clearance, which is twice the stroke of the load sensor 52 in its load bearing range, to be provided between the restriction portion 51b and the seat rail 11 or sensor base 19, thus alleviating dimensional and assembly precision requirements for components.

(5) As shown in FIG. 3B, the seat rail 11, the pin brackets 13, 33 and the arm 51 each have a bottom plate and left and right side plates and are U-shaped in cross section with the open side directed upward. With this construction, these members can be easily machined and realize a reduction in weight while maintaining necessary stiffness.

Figure 4:
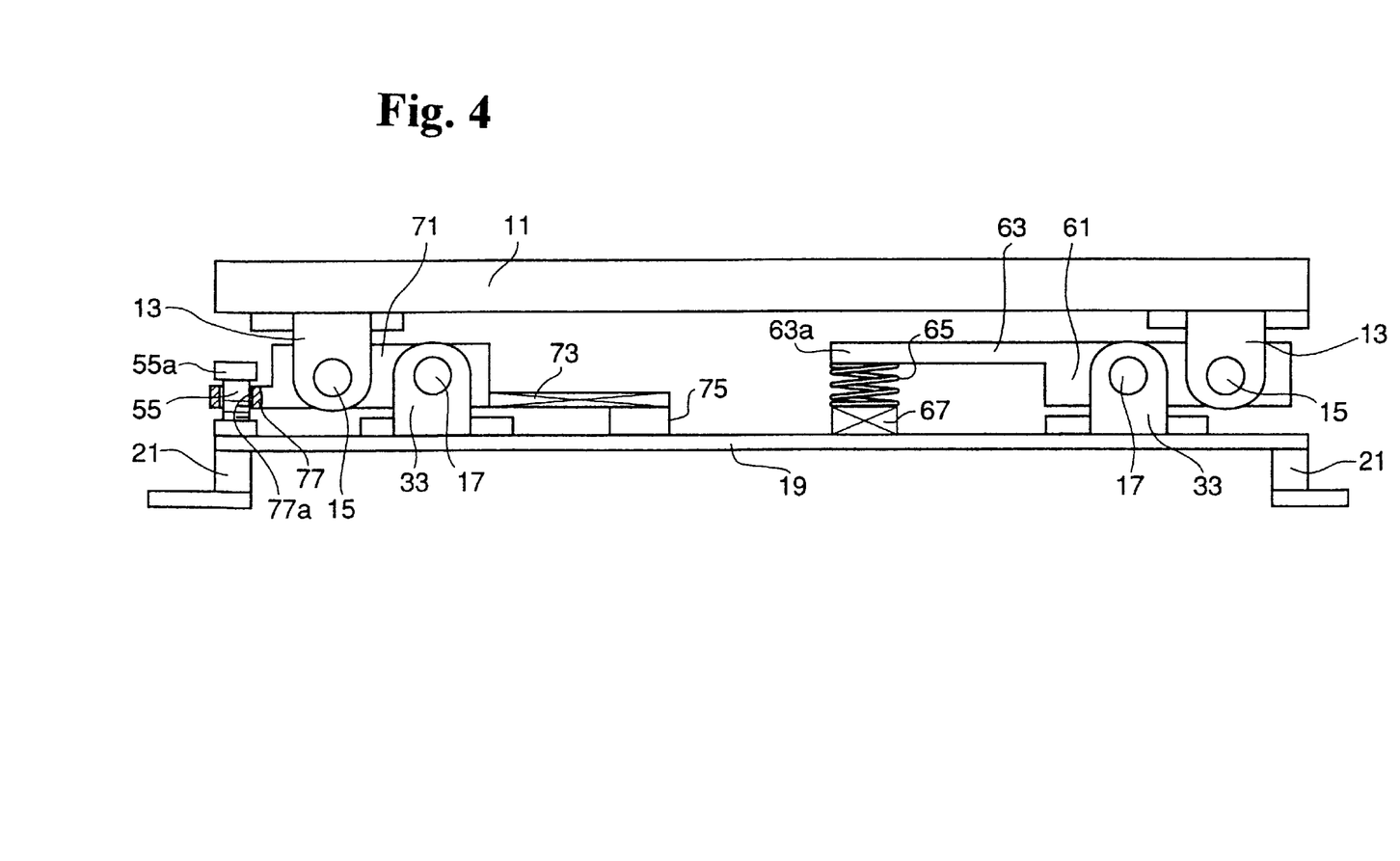
FIG. 4 is a side view showing a construction of still another embodiment of a seat weight measuring apparatus according to the invention.

FIG. 4 is a side view showing a further embodiment of a seat weight measuring apparatus according to the invention.

This embodiment has the following features.

(1) An arm 61 on the rear side (at the right in the figure) has an arm extension portion 63 to the center. Below a front end portion 63a of the arm extension portion 63, a load sensor 67 is disposed with a shock absorbing spring 65 interposed therebetween. The arm extension portion 63 magnifies the pivotal displacement of the arm 61 and transfers it to the shock absorbing spring 65 and the load sensor 67. The shock absorbing spring 65 is given a predetermined preload and interposed between the front end portion 63a of the arm and the sensor 67 to accommodate 70–99% of the displacement of the front end portion 63a. Hence, even when the stroke of the sensor 67 in the measuring range is small, an effective measurement is possible. This enables a sensor with a small stroke to be incorporated into peripheral members having relatively coarse precision.

(2) A load sensor (sensor plate) 73 on the front side (at the left in the figure) has a strain gauge (not shown) attached to the sensor plate made of a leaf spring material. The sensor plate 73 extends from the lower part of a center-side end of the arm 71 toward the right in the figure. A center-side end portion of the sensor plate 73 is connected to the upper surface of a pedestal 75 raised from the sensor base 19. The sensor plate 73 therefore deflects convexedly upward when the seat rail 11 is applied with a downward load and, when the seat rail 11 is acted upon by an upward load, deflects convexedly downward. These deflections are detected by the strain gauge to measure the load. Formed in a plate-like construction, the load sensor has a reduced thickness, which in turn reduces the overall thickness of the seat weight measuring apparatus.

A front side arm pivoting restriction mechanism (at the left in the figure) has a restriction rod 55 with a flange-like restriction portion 55a at its head. The restriction rod 55 is erected on the sensor base 19 passing through a restriction hole 77a formed in a restriction piece 77 projecting from the front end of an arm 71. There is a predetermined clearance between the outer circumferential surface of the restriction rod 55 and the restriction hole 77a.

The main part of the arm 71, as with the arm 51 shown in FIG. 3B, includes a bottom plate and side plates altogether being U-shaped in cross section with an open side directed upward. The diameter of the restriction portion 55a at the head of the restriction rod 55 is larger than that of the restriction hole 77a. When an upward force acts on the seat rail 11 and the arm 71 pivots upward, the upper surface of the restriction piece 77 abuts against the lower surface of the restriction portion 55a of the restriction rod 55, stopping the pivoting motion of the arm 71 and therefore the displacement of the seat rail 11 with respect to the seat bracket 21 is restricted. In the reference state, there is a clearance of about 1–2 mm between the lower surface of the restriction portion 55a of the restriction rod 55 and the upper surface of the restriction piece 77.

Figure 5A:
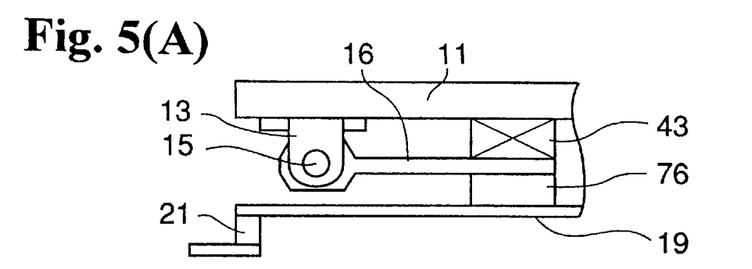
FIGS. 5(A)–5(C) are partial side views showing a construction of a further embodiment of a seat weight measuring apparatus according to the invention.
Figure 5B:
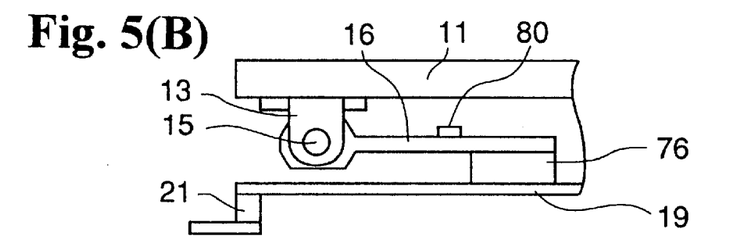
Figure 5C:
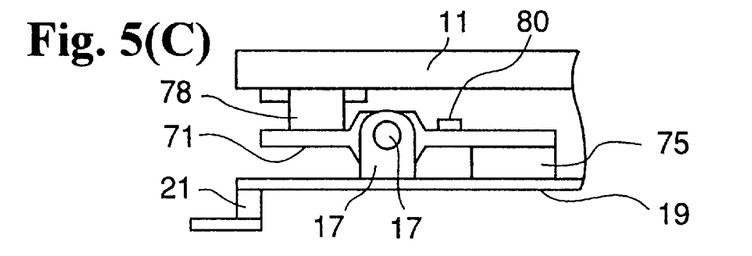

FIGS. 5A, 5B and 5C are partial side views showing the construction of a further embodiment of a seat weight measuring apparatus according to the invention.

The feature of this embodiment is that the arm is shaped like a plate, one end of the arm is pivotally supported and the other end is secured to the seat or car body. In this construction, the plate-like arm disposed horizontally in the reference state, when subjected to a vertical load, deflects vertically in a certain range depending on the elasticity of the arm material. The arm, however, does not easily deflect in the longitudinal or lateral direction. Thus, a displacement restriction mechanism is obtained which utilizes the deflection of the pivotable arm. Each seat weight measuring apparatus requires only one pivot, which simplifies the construction of the apparatus.

FIG. 5A shows a variation of FIG. 2B. The front end (at the left in the figure) of the plate-like arm 16 is pivotally supported on the pin bracket 13 by a pivot pin 15. The rear end (at he right in the figure) of the arm 16 is secured to a stationary bracket 76. The load sensor 43 is disposed between the seat rail 11 and the stationary bracket 76. When the seat is loaded, the seat weight causes the arm 16 to pivot about the pin 15, applying a load to the load sensor 43. When the pivot connecting portion moves vertically, the arm 16 deflects with respect to the stationary bracket 76. Because the arm 16 is shaped like a plate, it does not easily deflect longitudinally or laterally but deflects only vertically within a certain range. As a result, as with the arm pivotally supported at both ends, the arm 16 can regulate the displacement of the seat with respect to the car body, making it possible to selectively detect the vertical component of the load. With this construction, because a force vertically deflecting the arm 16 caused by the seat weight is distributed at a predetermined ratio to the load sensor 43, the seat weight can be determined from that ratio, though with accuracy slightly reduced.

The point in which the embodiment of FIG. 5B differs from the embodiment of FIG. 5A is that a strain sensor 80 instead of the load sensor is integrally attached to the arm 16. The advantage of this construction is it's capability to form the arm itself as a load receiving sensor plate or as a deflection and strain detecting sensor body of the load sensor mechanism. At the same time, the arm can work as a displacement restriction mechanism.

FIG. 5C is a variation of the embodiment described by FIG. 4. What is different from the embodiment of FIG. 4 is that the arm 71 is pivotally supported at its central part on a bracket 33 by a pivot pin 17. The front end of the arm 71 is secured to a bracket 78 and the rear end to a pedestal 75. The strain sensor 80 is disposed between the central part (pivotally supported point) and the rear end of the arm 71.

When the seat is loaded, the arm 71 is pivoted counterclockwise about the pin 17 and deflects relative to the stationary portion. By transferring the seat load through the pivot at the central part of the arm 71, only the vertical deflection component of the arm can be transmitted to the load sensor mechanism formed integral with the arm.

Figure 6A:
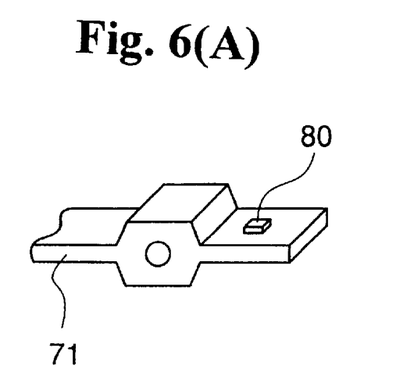
FIGS. 6(A)–6(B) are partial side views showing examples of sensor positions in the embodiment of a seat weight measuring apparatus of FIG. 5.
Figure 6B:
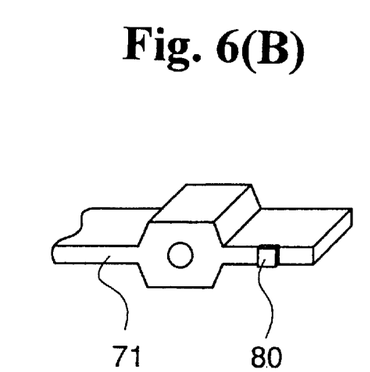

For detecting a bending strain, the strain sensor 80 used here is placed on the upper surface or lower surface of the arm 16 as shown in FIGS. 6A and 6B, for detecting a shearing force, the strain sensor 80 is placed on the side surface of the arm 16 as shown in FIG. 6B.

Figure 7:
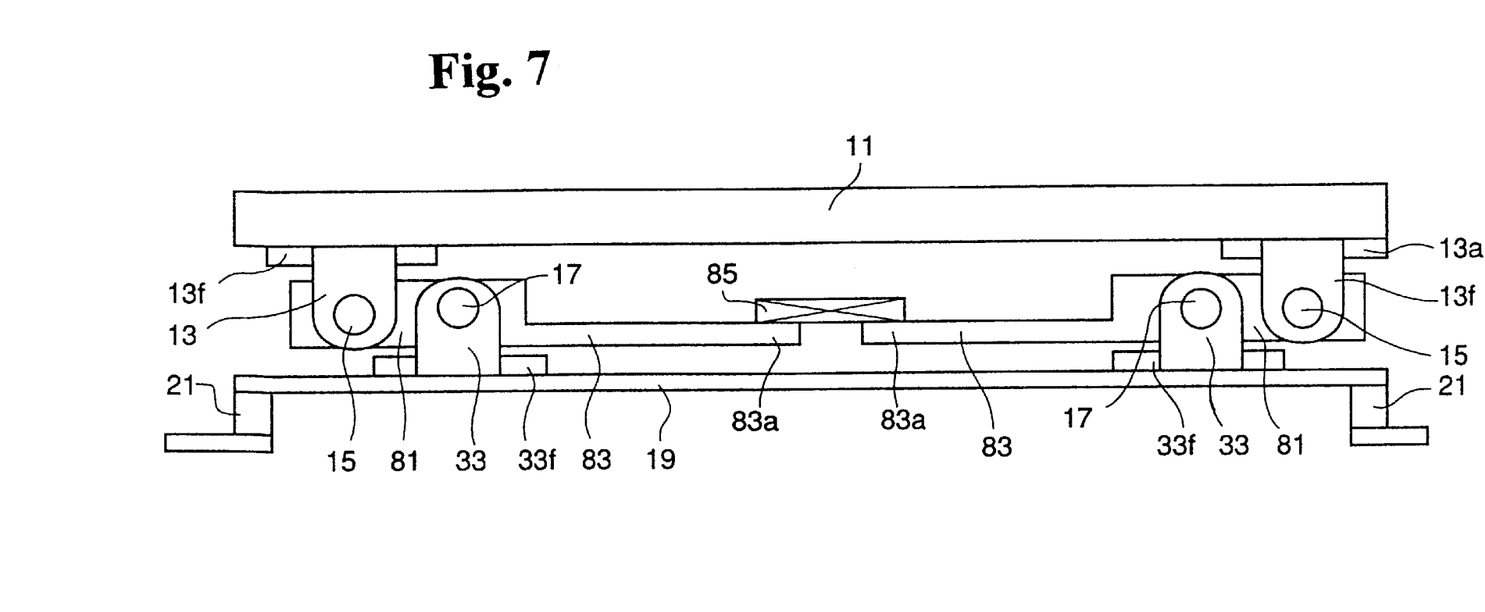
FIG. 7 is a side view showing a construction of a further embodiment of a seat weight measuring apparatus according to the invention.

FIG. 7 is a side view showing the construction of a further embodiment of a seat weight measuring apparatus according to the invention.

This embodiment has the following features.

(1) Pivotal seat connecting mechanisms each including shaft pins 15, 17 and arm 81 are symmetrically disposed at the front and rear part of the seat rail 11; arm extension portions 83 extend from the both arms 81 toward the center; and a load sensor (sensor plate) 85 spans between the central side front ends of the arm extension portions 83. The arm extension portions 83 are secured to the lower part of central side ends of the front and rear arms 81, extending parallel to the sensor base 19 toward the center. Central end portions 83a of the arm extension portions 83 are opposed to each other at a predetermined distance apart. The central end portions 83a are bridged by the sensor plate 85 which is placed on and rigidly secured to these end portions. The sensor plate 85 can be integrally formed with the arms.

A deformation caused by a load acting on the seat rail 11 is conveyed to the sensor plate 85 through the arms 81 and the arm extension portions 83. The deformation thus transmitted is detected by a strain gauge (not shown) attached to the sensor plate 85 to measure the load acting on the seat rail 11. This enables the front and rear loads acting on the single seat rail 11 to be summed up by the load sensor at one location, which in turn can reduce the number of parts used in the seat weight measuring apparatus and thereby simplify the associated circuit.

(2) The displacement restriction mechanism is constructed as follows. When the front and rear arms 81 are pivoted, their upper or lower surface engages the lower or upper surface of the pedestal 13f, 33f of the pin bracket 13, 33, stopping the pivoting motion.

Figure 8:
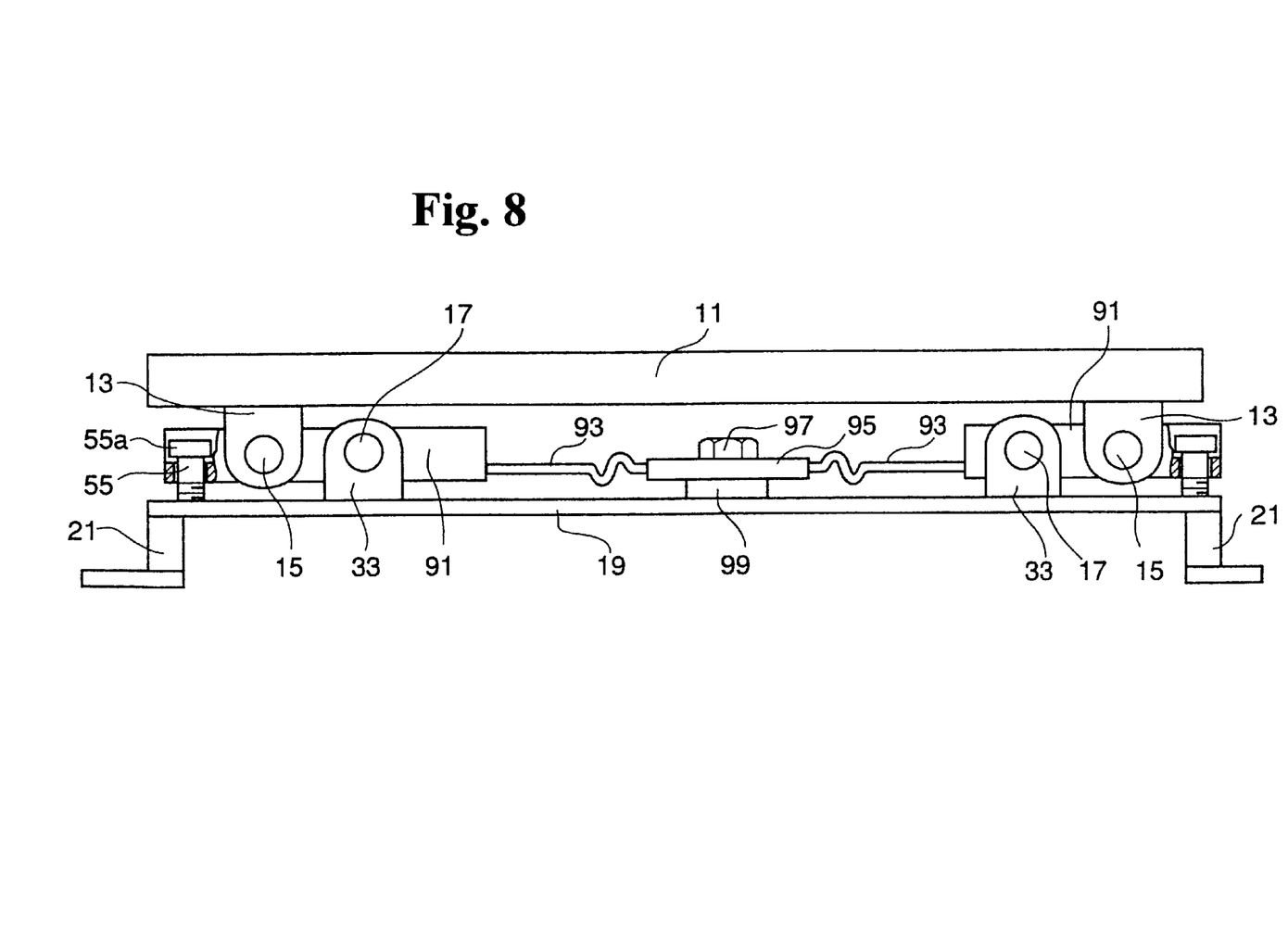
FIG. 8 is a side view showing a variation of the embodiment of a seat weight measuring apparatus shown in FIG. 7.

FIG. 8 is a side view showing a variation of the embodiment of FIG. 7.

The features of this embodiment of a seat weight measuring apparatus are as follows.

(1) Arm extension portions 93 have a shock absorbing spring structure. That is, the arm extension portions 93 extend from the central side ends of the front and rear arms 91 toward the center. The arm extension portions 93 have one part thereof meandering up and down like bellows so that they are easily deformable also in the longitudinal direction, thus function as shock absorbing springs. Central side ends of the arm extension portions 93 are connected to ends of a sensor plate 95. The shock absorbing spring function of the arm extension portions 93 offers an advantage of increasing the vertical displacement without significantly deflecting the sensor plate 95.

(2) The sensor plate 95 is secured at its central part by bolt 97 to a pedestal 99 rising from the sensor base 19. The sensor plate 95 is applied with a tensile or compressive force in addition to the vertical force from the both shock absorbing springs 93. When a force is applied that lifts the seat rail 11, a resulting displacement is such that the front and rear pin brackets 33 on the sensor base 19 tend to move away from each other. On the other hand, when a force is applied that pushes down the seat rail 11, a resulting displacement is such that the front and rear pin brackets on the sensor base 19 tend to move toward each other. This construction provides an advantage of absorbing the tensile or compressive force effecting around the seat rail 11, thus transmitting the vertical force to the sensor plate 95.

(3) The displacement restriction mechanism has the similar construction to that of the front displacement restriction mechanism of FIG. 3(A). By arranging the displacement restriction mechanism (such as restriction rod 55), the pivot type seat connecting mechanism (such as shaft pins 15, 17 and arm 91) and the load sensor 95 longitudinally in series as shown in FIG. 8, it is possible to reduce the overall thickness of the seat weight measuring apparatus. In this embodiment, as in other embodiments, the seat rail and the sensor base may be interchanged in their positions. That is, the load sensor 95 and the associated components may be installed on the underside of the seat rail 11.

(5) The direction in which the seat is subjected to the greatest force at time of head-on collision is the longitudinal direction and the vertical direction, and this apparatus is structurally strong in these directions. In the vertical direction in particular, the seat and the car body stationary portion are directly connected by the restriction portion only through the pivot shaft, so the required strength of the arm and the sensor can be lowered. In other words, the apparatus does not directly transfer stresses (horizontal load) other than the vertical seat weight to the load sensor.

(6) Because the left and right load sensors can be formed integral with each other, the two sensors can easily be matched in terms of sensitivity and temperature characteristics and the parts count can be reduced.

Figure 9:
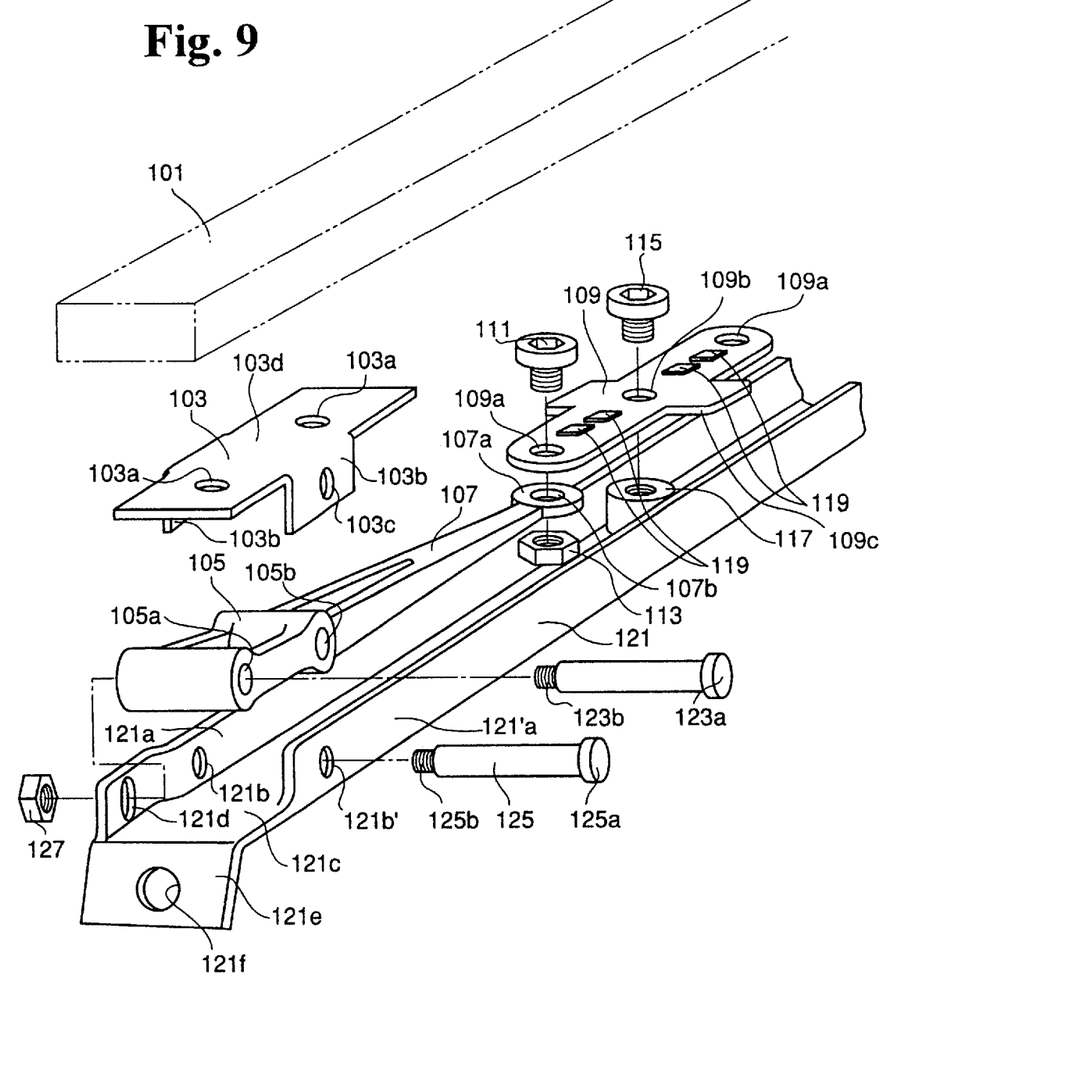
FIG. 9 is an exploded perspective view showing a detailed construction of a further embodiment of a seat weight measuring apparatus according to the invention.

FIG. 9 is an exploded perspective view showing a detailed construction of a further embodiment of a seat weight measuring apparatus according to the invention. This figure shows only a front half (or rear half) of the apparatus.

A pin bracket 103 is secured to the underside of an end portion of a seat rail 101 by bolts not shown. The pin bracket 103 is made by press-working a steel plate (high tension steel) with a thickness of 2.2 mm. The pin bracket 103 has a flat plate-like pedestal portion 103d pressed against the underside of the seat rail 101, and droop portions 103b protruding down from the left and right sides of a central part of the pedestal portion. The pedestal portion 103d is formed with bolt holes 103a at its front and rear part for fixing the bracket. The droop portions 103b have a pin hole 103c through which to insert a shaft pin 125. The droop portions 103b are assembled to clamp the left and right outer sides of an arm 105, with the pin hole 103c of the pin bracket 103 aligned with a hole 105a of the arm 105 to allow a shaft pin 123 to be inserted therein.

The arm 105 is made of magnesium, aluminum or other appropriate material. While the arm 105 may be formed of a U-shaped steel plate as with the sensor base, it is molded in this embodiment to reduce the overall thickness. The arm 105 has two front and rear pin holes 105a, 105b parallelly extending laterally. The front pin hole 105a receives the shaft pin 123 and the rear pin hole 105b receives the shaft pin 125.

The arm 105 has an arm extension portion 107 on the rear side, which decreases in width and thickness toward the rear. A part of the arm extension portion 107 near the arm 105 is two-pronged. The rear end of the arm extension portion 107 is formed with a ring portion 107a, at the center of which a bolt hole 107b is formed. The ring portion 107a is fixed to the sensor plate 109 with bolt 111 and nut 113. Though not shown, another rear arm with an extension portion is arranged on the rear side of the sensor plate 109 (to the right on the far side in the figure).

The sensor plate 109 is a strip member (made of stainless steel and measuring 2 mm thick by 10 mm wide by 60 mm long). The sensor plate 109 has strain gauges 119 attached to the upper (or lower) surface thereof which detect a tensile or compressive strain or a bending strain of the sensor plate 109. The sensor plate 109 is formed with bolt holes 109a at the front and rear ends thereof which constitute connecting portions for the arm extension portions 107. The sensor plate 109 is formed at its central part with a hole 109b through which a bolt 115 is passed to fix the sensor plate 109 to a pedestal 117 of a sensor base 121. The central portion of the sensor plate 109 protrudes to the left and right (to form widthwise expansion portions 109c). This portions 109c are used for extracting sensor signals.

The sensor base 121 is vertically opposed to the seat rail 101 and extends longitudinally. The seat weight measuring apparatuses are placed on the sensor base 121. The sensor base 121 is made of a high tension steel plate (High Tension Steel 60) 2.2 mm thick and is U-shaped in cross section with an open side directed upward, measuring about 400 mm long by 41 mm wide by 20–25 mm high. The whole seat weight measuring apparatus is accommodated in this dimension. Most part of the sensor base 121 is U-shaped in cross section, comprising a bottom plate 121c and side plates 121a. In this U-shaped cross section are installed the arms 105 and the sensor plate 109. The pedestal 117 for fixing the sensor plate 109 is secured to the central part of the bottom plate 121c.

The ends of the sensor base 121 are formed with downwardly inclined seat bracket fixing portions 121e that are formed with bolt holes 121f. As shown in FIG. 9, the seat bracket fixing portions 121e are fixed to the seat brackets 21 by bolts (not shown).

A side plate 121a', on the near side in the figure, of the sensor base 121 is formed with pin holes 121b' at its end portions. Another side plate 121a on the far side is also formed with pin holes 121b at positions facing the pin holes 121b'. A portion of the arm 105 formed with the pin hole 105b is fitted on the inner side of these side plates 121a, 121a' at the pin holes 121b, 121b'. Then, the hole 105b and the holes 121b, 121b' are aligned and the shaft pin 125 is inserted into these holes. Thus, the arm 105 is pivotally supported on the sensor base 121 by the shaft pin 125. The shaft pin 125 has an integrally formed head 125a at the right end portion in the figure and a thread 125b at the left end portion. A nut not shown is screwed over the thread 125b to fix the shaft pin 125 to the sensor base 121.

A nearest end portion of the far-side side plate 121a has a vertically elongate slot 121d. A portion of the side plate where the slot 121d is formed is slightly shifted sideways. On the inner side of the slot 121d is situated the front pin hole 105a of the arm 105 with the droop portion 103b of the pin bracket 103 interposed therebetween. An end portion of the shaft pin 123 passing through the pin hole 103c of the pin bracket 103 and the pin hole 105a of the arm 105 passes through the slot 121d. A thread 123b at the left end portion of the shaft pin 123 projects out of the slot 121d and is fastened with a nut 127. The nut 127 does not press against the side of the sensor base 121.

There is a gap between the shaft pin 123 and the slot 121d, so that when the arm 105 pivots about the pin hole 121b, the shaft pin 123 oscillates vertically in the slot 121d. However, when the vertical gap decreases and the shaft pin 123 contacts the upper or lower end of the slot 121d, the pivoting motion of the arm 105 is stopped.

This construction enables the displacement restriction mechanism to be formed requiring few additional components.

Figure 10:
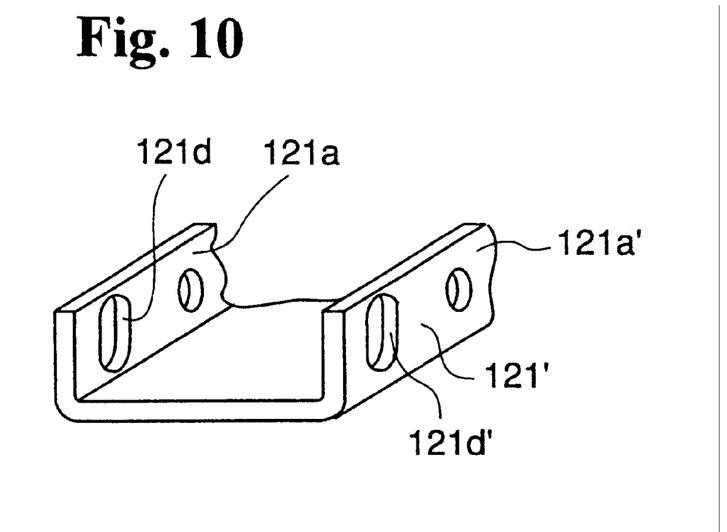
FIG. 10 is a perspective view showing a variation of a sensor base.

FIG. 10 is a perspective view showing a variation of the sensor base.

In FIG. 10, the slots 121d, 121d' are formed in both of the side plates 121a, 121a'. In this case, the ends of the shaft pin 125 passes through the two slots 121d, 121d'. This arrangement is more robust because the motion of the shaft pin 125 is restricted at its both ends.

Figure 11:
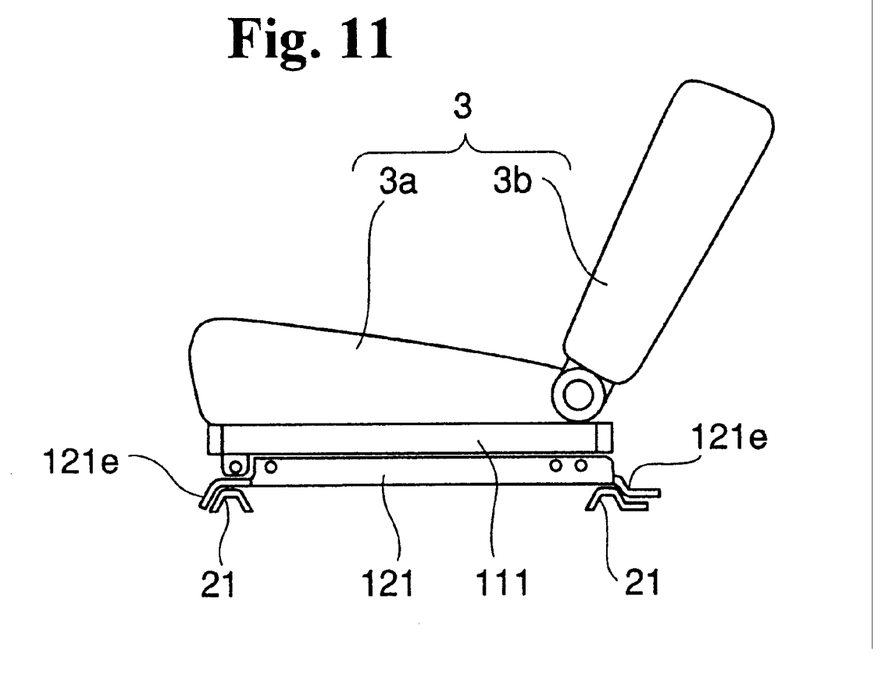
FIG. 11 is a side view showing the embodiment of a seat weight measuring apparatus of FIG. 9 assembled under a seat.

FIG. 11 is a side view showing the embodiment of a seat weight measuring apparatus of FIG. 9 assembled under the seat.

The seat weight measuring apparatus is accommodated in the sensor base 121 and compactly assembled under the seat rail 111 without protruding out of the seat rail 111 either in the longitudinal or widthwise direction. The sensor base 121 is placed on and secured to the front and rear seat brackets 21.

The present invention is not limited to the embodiments described above but may be modified in a variety of ways in accordance with to a basic philosophy as defined by appended claims of the invention.

As can be seen from the foregoing description, the invention has the following advantages and effects.

(1) Because the seat is connected to a car body by the seat connecting mechanism which includes a pivotable arm, the displacement of the seat relative to the car body when the seat is loaded is regulated to some extent. Hence, the characteristic of the load acting on the load sensor is simplified, facilitating the measurement of the weight of a passenger on the seat.

(2) When one set of load sensors is provided on each side of the seat, the number of sensors and the number and length of the wires can be reduced.

(3) The number of components can be reduced by a variety of means, which include: constructing the displacement restriction mechanism in a configuration that restricts the displacement of the shaft pin of the pivot relative to the car body; or providing means for restricting the displacement of the shaft pin to a pivot connecting member, such as seat brackets and a seat rail.

What is claimed is:

1. A seat weight measuring apparatus for measuring a seat weight including a weight of a passenger sitting on an automotive seat, comprising:

seat connecting mechanisms including arms for connecting the seat to seat fixing portions located on a car body, the arms each having a seat side end thereof and a car body side end thereof, one end or both ends pivotally supported on pivots;

load sensor mechanisms for receiving and detecting the seat weight applied between the car body and the seat; and displacement restriction mechanisms for restricting displacement of the seat relative to the seat fixing portions within a predetermined range, the displacement mainly caused by a pivotal motion of the arms.

2. A seat weight measuring apparatus for measuring a seat weight including a weight of a passenger sitting on an automotive seat, comprising:

seat connecting mechanisms at four locations, front and rear on both lateral sides, including arms, the arms for connecting seat rails to seat fixing portions located on a car body, the arms each having a seat side end thereof and a car body side end thereof, one end or both ends pivotally supported on pivots;

load sensor mechanisms for receiving and detecting the seat weight applied between the car body and the seat rails; and displacement restriction mechanisms for restricting displacement of the seat rails with respect to the seat fixing portions within a predetermined range, the displacement mainly caused by a pivotal motion of the arms.

3. A seat weight measuring apparatus according to claim 1, wherein the load sensor mechanisms receive the seat weight through the arms.

4. A seat weight measuring apparatus according to claim 1, wherein the load sensor mechanisms selectively receive and detect a vertical component of the seat weight bearing on the arms.

5. A seat weight measuring apparatus according to claim 1, wherein the load sensor mechanisms each include a sensor plate for receiving a load and a sensor body for detecting a deflection or strain of the sensor plate, and the sensor plates are integrally formed with the arms.

6. A seat weight measuring apparatus according to claim 2, wherein the load sensor mechanisms each include a sensor plate for receiving a load and a sensor body for detecting a deflection or strain of the sensor plate, and the sensor plates integrally or separately connected to the arms connect together the arms of the front and rear seat connecting mechanisms at a center of the seat rail.

7. A seat weight measuring apparatus according to claim 1, wherein one set of the load sensor mechanism is provided on each lateral side of the seat, and the load sensors detect a total weight bearing on an entire left or right part of the seat.

8. A seat weight measuring apparatus according to claim 1, wherein the displacement restriction mechanisms restrict displacements of shaft pins of the pivots relative to the car body or the seat.

9. A seat weight measuring apparatus according to claim 7, wherein pivot connecting members such as seat brackets and seat rails are provided with portions that restrict displacements of the shaft pins.

10. A seat weight measuring apparatus according to claim 1, wherein the displacement restriction mechanisms are only provided near seat belt anchor fixing portions of the seat or seat rails, or only the displacement restriction mechanisms near the seat belt anchor fixing portions are robust enough to have a breaking load of 2000 kgf or more.

* * * * *